(12) United States Patent
McAllister et al.

(10) Patent No.: US 7,889,738 B2
(45) Date of Patent: Feb. 15, 2011

(54) SHARED APPLICATION INTER-WORKING WITH VIRTUAL PRIVATE NETWORKS

(75) Inventors: Shawn McAllister, Manotick (CA); Kenneth Barr, Ottawa (CA); Erick Gonzalez, Nepean (CA)

(73) Assignee: Solace Systems Inc., Ottawa, ON (CA)

( * ) Notice: Subject to any disclaimer, the term of this patent is extended or adjusted under 35 U.S.C. 154(b) by 546 days.

(21) Appl. No.: 11/612,255

(22) Filed: Dec. 18, 2006

(65) Prior Publication Data

US 2007/0140250 A1 Jun. 21, 2007

Related U.S. Application Data

(60) Provisional application No. 60/752,028, filed on Dec. 21, 2005.

(51) Int. Cl.
*H04L 12/28* (2006.01)
(52) U.S. Cl. ....................... 370/392; 715/734
(58) Field of Classification Search ................ 370/392, 370/401; 715/734
See application file for complete search history.

(56) References Cited

U.S. PATENT DOCUMENTS 6,339,595 B1 1/2002 Rekhter et al.

| 2002/0191250 | A1* | 12/2002 | Graves et al. ............... 359/128 |
| 2003/0174706 | A1* | 9/2003 | Shankar et al. ............. 370/393 |
| 2005/0254495 | A1* | 11/2005 | West et al. .................. 370/389 |
| 2006/0090136 | A1* | 4/2006 | Miller et al. ................ 715/734 |
| 2006/0233180 | A1* | 10/2006 | Serghi et al. ................ 370/401 |

OTHER PUBLICATIONS

Generic Requirement for Provider Provisioned Virtual Private Networks A. Nagarajan, Juniper Networks Jun. 2004 The Internet Spcoetu.
BGP/MPLS VPNs, Mar. 1999, the Intenet Society, E. Rosen, Y Rekhter, Cisco Systems, Inc. Mar. 1999.

* cited by examiner

*Primary Examiner*—Dang T Ton
*Assistant Examiner*—Wei Zhao
(74) *Attorney, Agent, or Firm*—Marks & Clerk; Richard J. Mitchell

(57) ABSTRACT

A method of providing a shared application infrastructure simultaneously to multiple independent virtual private networks with potentially overlapping IP addresses, involves connecting to an underlying layer 1, 2 or 3 virtual private network offering one or more virtual private networks, determining which virtual private network traffic is being received from or sent into, maintaining logically separate routing tables per VPN to allow overlapping addresses, and providing an application which provides a logical instance of the service to each VPN.

20 Claims, 4 Drawing Sheets

SHARED APPLICATION INTER-WORKING WITH VIRTUAL PRIVATE NETWORKS

CROSS REFERENCE TO RELATED APPLICATION

This application claims the benefit of U.S. provisional application No. 60/752,028, filed Dec. 21, 2005, the contents of which are herein incorporated by reference.

FIELD OF THE INVENTION

This invention relates to data communication networks and in particular to a method of allowing an application to implement a shared virtualized service simultaneously to multiple private virtual networks.

BACKGROUND OF THE INVENTION

An enterprise with geographically distributed sites can implement a private network by utilizing a virtual private network (VPN) service from a service provider (also known as a communications carrier or communications provider) as an alternative to using leased lines to interconnect the various sites. A service provider can deploy such a VPN service using a variety of technologies and techniques, and can offer both Layer 2 and Layer 3 connectivity, using Layer 2 connections or Layer 2/3 tunnels. Examples of technologies to supply such VPN services are Frame Relay (FR) connections, Asynchronous Transfer Mode (ATM) connections, Ethernet tunnels, IP-based tunnels, MPLS, etc. Refer to RFC 3809, "Generic Requirements for Provider Provisioned Virtual Private Networks (PPVPN), June 2004, The Internet Society, the contents of which are incorporated herein by reference. U.S. Pat. No. 6,339,595, the contents of which are incorporated herein by reference, outlines a peer-model support for virtual private networks with potentially overlapping addresses. A similar technique is described in RFC 2547, "BGP/MPLS VPNs", March 1999, The Internet Society, the contents of which are incorporated herein by reference. These techniques allow a service provider to offer VPN service to a plurality of enterprises or organizations over a shared network infrastructure.

In the existing VPN prior art, the service provider is providing connectivity between the sites of a given VPN, either at Layer 2 or Layer 3. For example, the service provider may provide Frame Relay or ATM connectivity between sites; provide a virtual time-division multiplexed network, provide a virtual private LAN service, or provide an IP VPN. The user of the VPN, such as an enterprise, then deploys various communication and application equipment at each site connected to or using the VPN, such as customer-edge (CE) routers, firewalls, load balancers, and application servers, message-oriented middleware, etc. Each enterprise has its own set of equipment and applications to utilize its own VPN network.

Service providers are increasingly moving applications into their core data networks to offer value-added functions or services above simple bandwidth, LAN or IP connectivity between sites (including providing optional access from a VPN to the public Internet). An example of such a service is a hosted message routing service (which may utilize content-based routing), XML firewall, XML load balancing, etc. Such services could be provided over the public internet (example being hosted email or hosted web sites), but when the service provider wishes to provide value-added services within the VPN of each customer, then the solution must be able to operate in the presence of private IP addresses, since they are typically used within the VPNs of enterprises or organizations.

It is desirable to use a common infrastructure to provide such value-added services. However, if a common infrastructure is to support multiple different customers in different VPNs simultaneously, then it has to be able to support overlapping IP addresses, since different organizations are free to use the same range of private IP addresses for their own internal use.

One method to get around overlapping IP addresses is to use Network Address Translation (NAT) devices to translate private addresses into unique public addresses. For a description of NAT, refer to "Traditional IP Network Address Translator (Traditional NAT)", January 2001, The Internet Society, the contents of which are incorporated herein by reference. However, there are a number of issues with NAT: it does not function in all situations, such as fragmentation; it requires more infrastructure to install and manage, and if connection establishment is needed in both directions, static configuration tables are needed to allow external devices to connect into the private address realm.

Additionally, equipment to carry out functions such as message routing, XML firewalls, XML load balancers etc. typically handle one customer instance. Thus, for a service provider to support multiple customers via IP VPNs for such services, it would require a NAT per IP VPN or a separate device for the application per IP VPN. Note that the NAT and the application could be combined into a single device, but the result is still a plurality of devices to support multiple VPNs. Also, a significant limitation of the NAT solution is that if the application is to initiate a TCP connection into the VPN, then special pre-configured mappings are required on the NAT to statically provisioned IP addresses on the end devices. This limitation is not reasonable in practice.

Also required is the ability for the various customers using separate IP VPNs to share common information or to be able to interact with each other through an application such as message routing. For example, a service provider may wish to provide a shared set of information, such as real-time streaming stock quotes, into applications residing in different IP VPNs. A technique to allow this to occur in a cost-effective, secure and easy to manage manner is also required. Another example of such connectivity is the creation of "Community of Interest Networks" (COINs) where applications from different enterprises must communicate with each other over a common network to fulfill various functions such as negotiation and execution of certain financial transactions, for example.

Content-based networks are described in A Carzaniga, M. J. Rutherford, A. L. Wolf, A routing scheme for content-based networking, Department of Computer Science, University of Colorado, June 2003, the contents of which are incorporated herein by reference. In content routed networks, a publish/subscribe data communication is provided; wherein publishers can inject content into the network, and subscribers can subscribe to content from the network. The publishers and subscribers do not require knowledge of each other. Such networks can also provide point-to-point message communication, queue-based communication, and topic-based publish/subscribe communications.

SUMMARY OF THE INVENTION

The invention offers the ability to implement a virtualized service at Layer 7 simultaneously to multiple independent virtual private networks with potentially overlapping IP addresses using the same infrastructure.

According to one aspect of the invention there is provided a method a method of implementing a virtualized service simultaneously to multiple independent virtual private networks (VPNs) with potentially overlapping network addresses, comprising establishing said VPNs; maintaining logically separate routing tables for each VPN; and providing a logical instance of the virtualized service to each VPN while maintaining the integrity of the separate VPNs using shared equipment.

The virtual private network can be conveniently implemented, for example, at underlying protocol layers 1, 2 or 3.

Multiple independent VPNs can be offered their own private instance of a service over a shared infrastructure, but also the invention applies to the case where a service, such as an information source such as a stock quote stream, can be delivered into multiple VPNs. In this case, a single logical instance of the service is delivered to multiple VPNs simultaneously.

In accordance with the principles of the invention, it is possible to simultaneously offer flows which are limited to within a given VPN, and at the same time allow other communications between VPNs where allowed by entitlements.

Accordingly another aspect of the invention provides a method of implementing a virtualized service simultaneously to multiple independent virtual private networks (VPNs) with potentially overlapping network addresses, comprising establishing said VPNs; maintaining logically separate routing tables for each VPN; and providing a single logical instance of the virtualized service to at least two VPNs to allow communication between VPNs in accordance with pre-established entitlements using shared equipment.

BRIEF DESCRIPTION OF THE DRAWINGS

The invention will now be described in more detail, by way of example only, with reference to the accompanying drawings, in which:—

DETAILED DESCRIPTION OF THE PREFERRED EMBODIMENTS

Figure 1:
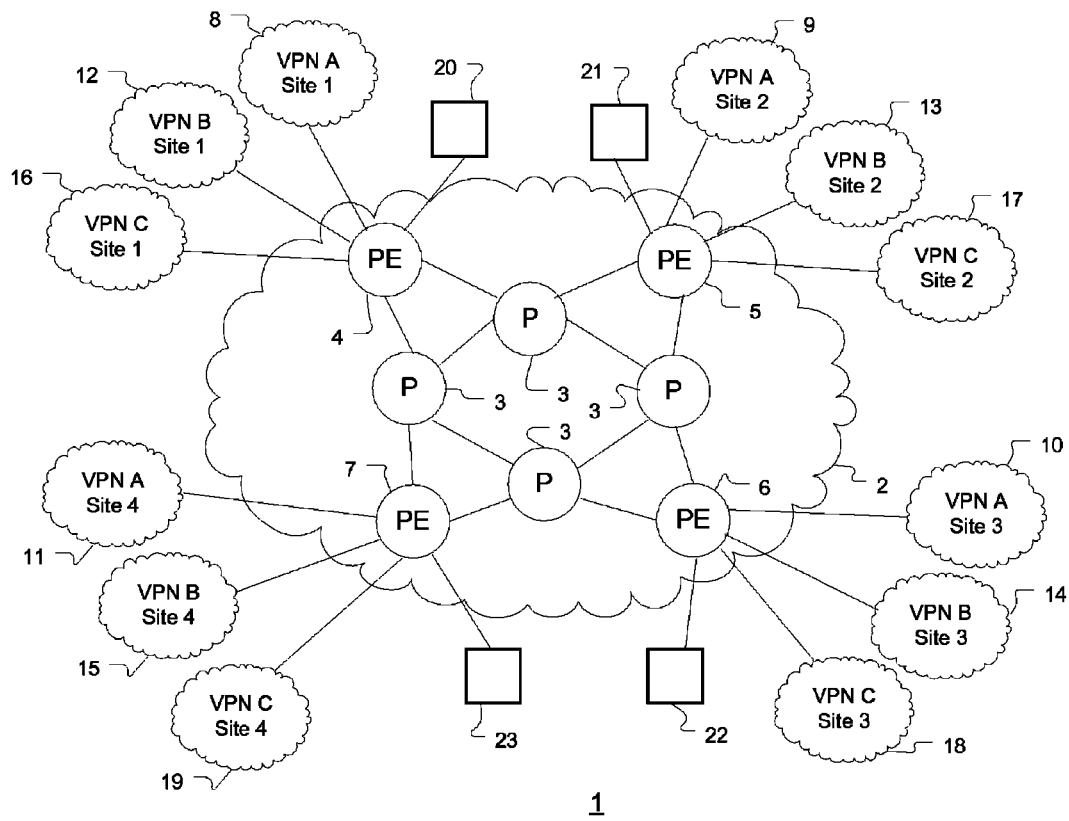
FIG. 1 shows an example service provider network providing VPN service to multiple customers.

FIG. 1 shows an example network 1 which consists of a service provider IP/MPLS network 2 which is providing IP VPN service to multiple customers (enterprises, organizations, etc.). The IP/MPLS network consists of provider (P) routers 3 and Provider Edge (PE) routers 4, 5, 6 and 7, as is known in the art. VPN customer A has four interconnected sites 8, 9, 10 and 11 interconnected by the service provider VPN service. Similarly, VPN customer B has four interconnected sites 12, 13, 14 and 15; and VPN customer C has four interconnected sites 16, 17, 18 and 19. At a given customer site such as 8, the VPN service will terminate on a device such as a Customer Edge (CE) router, or a firewall, etc. as is known in the art, and behind such devices will be hosts, applications servers, etc. The IP VPN could terminate directly on a host or server as well. Refer to RFC 2547 and U.S. Pat. No. 6,339,595 for details on the operation of network 2.

It should be noted that network 2 does not have to be an IP/MPLS network offering IP VPN services, but can be other forms of VPN service, such as Frame Relay (FR), Asynchronous Transfer Mode (ATM), Virtual Private Lan Service (VPLS), etc.

In order to provide enhanced services, the service provider which operates network 2 can add additional equipment to the service provider network. One example service is to provide content-based message routing services (refer to co-filed U.S. application Ser. No. 11/012,113, the contents of which are incorporated herein by reference) to provide application connectivity. Devices 20, 21, 22 and 23 can be added to the service provider network to provide such services. It is desired for such infrastructure to be able to service multiple VPN customers using shared equipment, just as PE routers 4, 5, 6 and 7 and P routers 3 provide service for multiple customer VPNs within network 2. In the case of content-based message routing, devices 20, 21, 22 and 23 can be a device such as the 3200 Multiservice Message Router provided by Solace Systems, Inc.

For a device such as 20 to reside as part of each participating customer's VPN, it has to be able to accept traffic from and send traffic to multiple VPNs and to handle overlapping IP addresses, since customer VPNs typically use private IP addressing schemes in which IP addresses from a common range are used by each customer. Devices 20, 21, 22 and 23 need to reside in each VPN, and act as additional sites in each VPN. Thus, devices 20, 21, 22 and 23 appear as four more sites in each of VPN A, B and C.

While devices 20, 21, 22 and 23 are shown as separate devices connected to PE routers 4, 5, 6, and 7, these devices could be combined into the PE routers.

Figure 2:
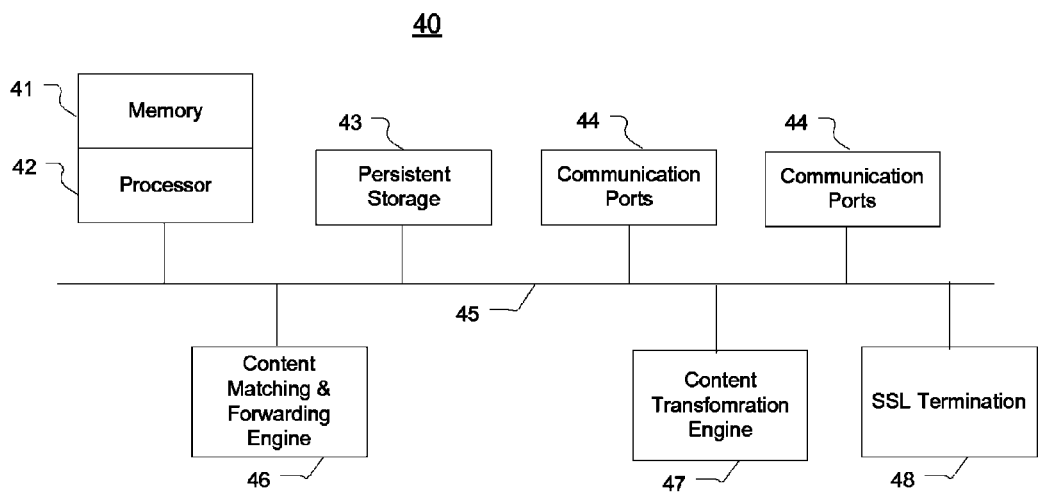
FIG. 2 shows a block diagram of a device that may be used in this invention.

FIG. 2 shows a block diagram of an exemplary device 40 (representing a device such as 20, 21, 22 or 23) of the present invention, which includes a (or many) central processing unit (CPU) 42 with associated memory 41, persistent storage 43, a plurality of communication ports 44 (which may just do basic input/output functions, leaving the protocol processing to CPU 42, or which may have specialized processors such as networks processors or other hardware devices to do protocol processing as well, such as IP processing, UDP or TCP processing, HTTP processing, etc), and a communication bus 45. Either integrated into communications port network processors 44, or CPU 42 or a separate device off the communication bus 45 is a SSL termination processor 48. For an example application of content routing, the processor 42 is responsible for tasks such as running content routing protocols XLSP and XSMP, running VRRP protocols, computing routing tables, processing received documents or messages and routing them based on content (which may involve specialized hardware assist 46 which is outside the scope of this invention), transforming the content of messages from one format to another (which may involve specialized hardware assist 47 which is outside the scope of this invention) and other router tasks known in the art. The associated memory 41 is used to hold the instructions to be executed by processor 42 and data structures such as message routing tables and protocol state. The persistent storage 43 is used to hold configuration data for the router, event logs, and programs for the processor 42. The persistent storage 43 may be redundant hard disks, flash memory disks or other similar devices. The communication ports 44 are the ports which the router uses to communicate with other devices, such as other routers and hosts (publishers and subscribers). Many different technologies can be used, such as Ethernet, Token Ring, SONET, etc. The communications bus 45 allows the various router components to communicate with one another, and may be a PCI bus (with associated bridging devices) or other inter-device communication technologies known in the art.

Figure 3:
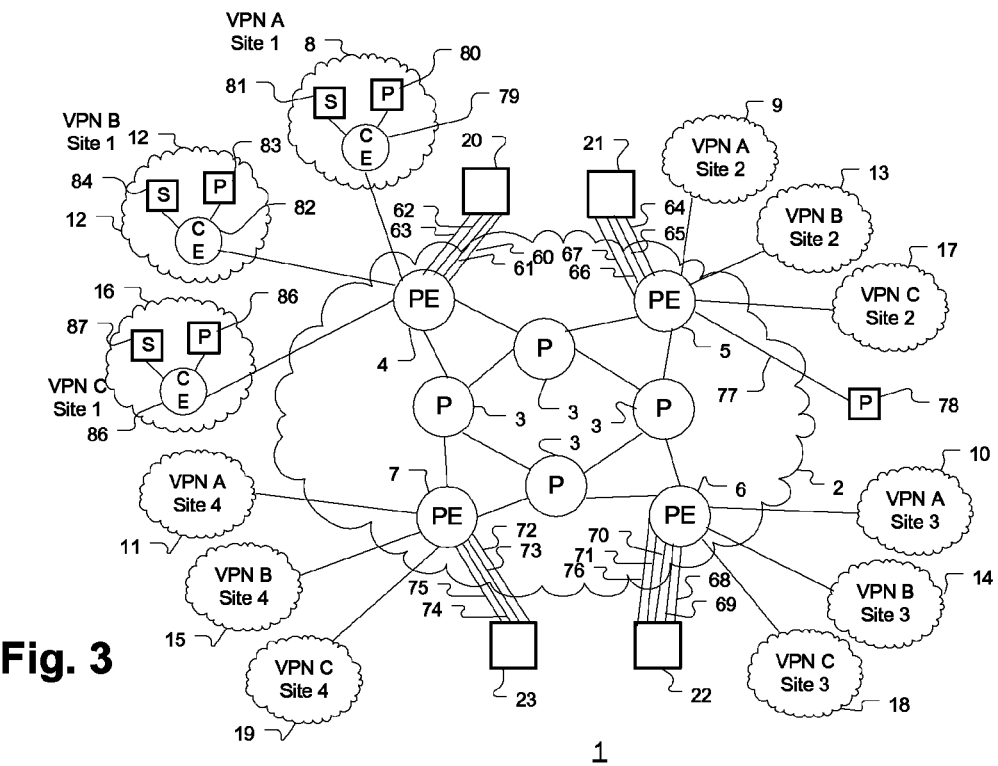
FIG. 3 shows an example service provider network showing application devices servicing multiple VPNs.

FIG. 3 shows the network of FIG. 1 with more detail added. Components that are common to FIG. 1 and FIG. 3 share the same label. In FIG. 3, an example application of message routing using a publish/subscribe paradigm is shown as an example of an application that can run in a service provider network and, using a common infrastructure, inter-work with multiple VPNs to provide a service-provider managed message routing service to multiple customers. In site 1 for Customer A (8), more detail is shown, including a Customer Edge router 79 connecting to PE router 4. There is a plurality of subscribers 81 present, which may be applications running on hosts, servers etc. subscribing to information from the message routing service being provided by the service provider. There may also be a plurality of publisher applications 80 running, which can inject content into the message routing service. Note that an application could act as both a publisher and a subscriber. In site 1 for Customer B (12), there is a CE router 82, a plurality of subscribers 84, and a plurality of publishers 83. In site 1 for Customer C (16), there is a CE router 88, a plurality of subscribers 87, and a plurality of publishers 86. Similar instances of publishers and subscribers (not shown) can run in the other sites 9 through 11 for Customer A; 13 through 15 for customer B; 17 through 19 for Customer C.

Device 20 is a message router, and connects to PE 4 over four separate interfaces: 60 to connect into customer VPN A; 61 for VPN B; 62 for VPN C; and 64 for a new VPN which is the message routing backbone VPN (referred to below as the BB VPN). Note that the connections into the various VPNs could be over separate physical interfaces, or over separate sub-interfaces on a single physical interface using sub-interfaces such as Frame Relay logical circuits (over separate DLCIs) or ATM logical circuits (using separate VPI/VCIs); or by using Ethernet VLAN tagging (802.1 q) to allow logical ports over Ethernet; a combination of the above; or other techniques known in the art.

Similarly, device 21, 22 and 23 are also message routers connected into multiple VPNs. Device 21 connects into VPNs A, B, C and BB over interfaces 64, 65, 66 and 67 respectively; device 22 connects into VPNs A, B, C and BB over interfaces 68, 69, 70 and 71 respectively; and device 23 connects into VPNs A, B, C and BB over interfaces 72, 73, 74 and 75 respectively. Device 22 also connects over interface 76 into another VPN called VPN D, the use of which will be described later.

Note that to the underlying IP VPN network 2; devices 20 through 23 appear like other VPN user devices (such as CE 79). Devices 20 through 23 connect into multiple VPNs simultaneously; but this does not have to be known by network 2, i.e. network 2 may consider a device such as 20 to be four separate devices.

Device 78 is another publisher device which is in its own VPN D, and connects to PE 5. Thus, publisher 78 and device 22 are both in VPN D and can communicate with each other via network 2. Publisher 78 can be used to provide a service to other VPNs in a shared manner, which will be explained later.

As explained in Ser. No. 11/012,097, the message routers 20 through 23 connect with each other, using protocols such as TCP, to form a logical message routing topology, and run dynamic content-based routing protocols to discover the message routing topology, dynamically distribute subscriptions, etc. In co-filed U.S. application Ser. No. 11/012,168, the contents of which are incorporated herein by reference, the concept of entitlements is explained, which allows a message router such as 20 to service multiple separate customer groups and to keep traffic separated from different groups that are not allowed to communicate or share information. Also explained is that a given application, such as a subscriber 81 or a publisher 80, can belong to more than one entitlement group.

Figure 4:
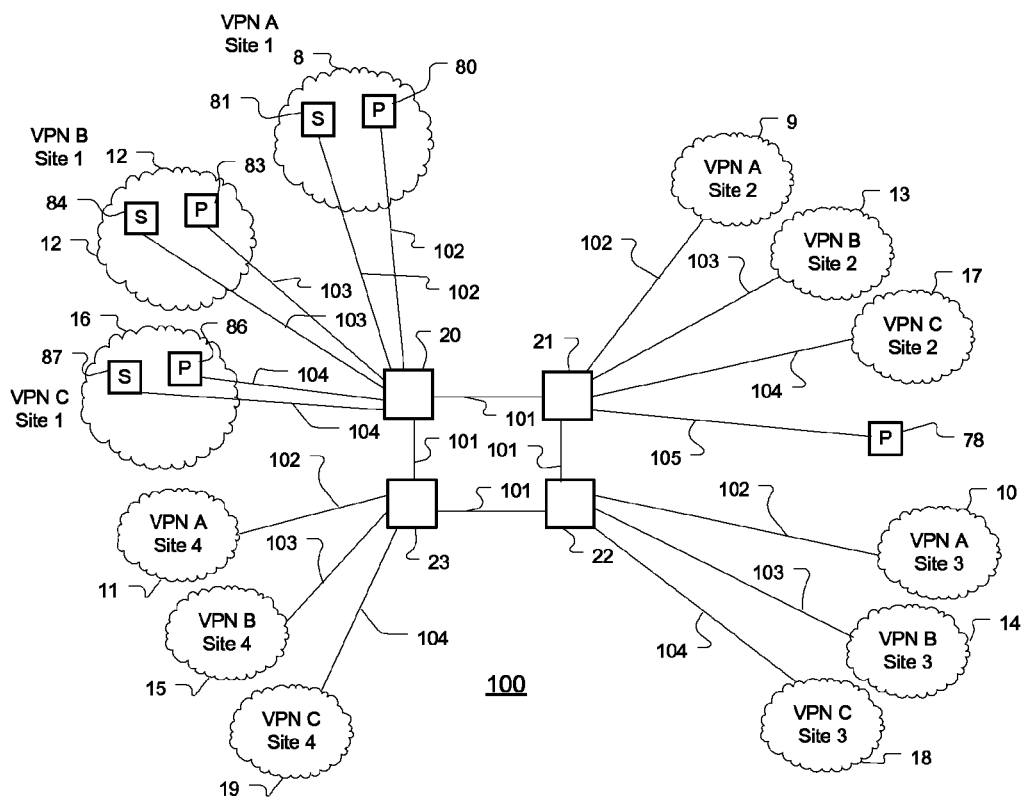
FIG. 4 shows the logical overlay view of a distributed message routing application serving multiple VPNs.

FIG. 4 shows the logical overlay view 100 of the distributed message routing example application serving multiple VPNs using shared infrastructure. Message routers 20, 21, 22 and 23 are interconnected by links 101 which reside in the BB VPN. Note that link 101 is a logical link between the message routers. For example, a logical link may be one or more TCP connections set up between various pairs of message routers to form a message routing backbone topology. Note that the message routers do not have to be fully meshed; refer to Ser. No. 11/012,097. Note that the BB VPN interconnecting the message routers is used to carry traffic between message routers for various customers, with traffic separation accomplished via message routing entitlements.

Each example device (being a message router in this example), has a globally unique XVRID as defined in co-filed U.S. application 60/696,790, the contents of which are incorporated herein by reference, and this is the termination point for all publish/subscribe application connections. This globally unique address needs to be propagated into the VPN's A,B,C and D from Message routers 20,21,22 and 23 through PEs 4,5,6 and 7. Customer A connects publish/subscribe applications (such as publishers 80 and subscribers 81) into the various message routers XVRID, using connectivity via VPN A over logical links 102. For example, site 1 of customer A (8) connects to message router 20; site 2 of customer A (9) connects to message router 21; site 3 of customer A (10) connects to message router 22; and site 4 of customer A (11) connects to message router 23. Note that the underlying service provided by network 2 may allow any site to connect to any site within the same VPN (this capability depends upon the specific type of VPN technology used). So, at site 1 of customer A (8), an application such as a subscriber 81 could connect to a different message router than the connection to message router 20 shown, still using connectivity through VPN A.

Similarly, customer B connects publish/subscribe applications 83 and 84 at the various sites 12 through 15 to message routers 20 through 23 XVRID via logical links 103 (within VPN B); and customer C connects publish/subscribe applications 86 and 87 at the various sites 16 through 19 to message routers 20 through 23 XVRID via logical links 104 (within VPN C). Publisher 78 connects via logical link 105 via VPN D to message router 21.

Figure 5:
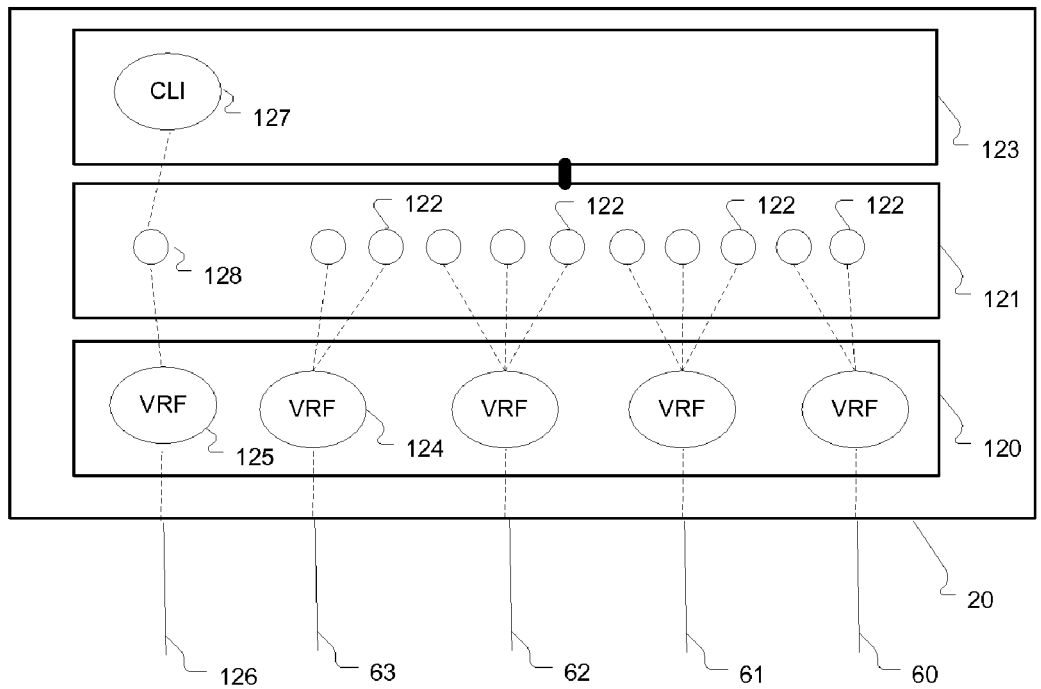
FIG. 5 shows a device supporting connection into multiple VPNs.

FIG. 5 shows an example device 20 (being a message router in this example), being connected into multiple VPNs. Each of interfaces 60 through 63 is a connection into an IP VPN. For example, if Ethernet ports with VLAN tagging are used as the interface technology, then Table 1 below shows one example of how two separate Ethernet ports with VLAN tagging could be utilized to connect into four different VPNS. Note that the "untagged" Ethernet interface can also be used.

TABLE 1

Example use of Ethernet VLAN Tags for IP VPN connectivity

| Interface Reference | Physical port and VLAN Tag | Usage |
|---|---|---|
| 60 | Ethernet port 1, VLAN tag 200 | Connection into VPN A |
| 61 | Ethernet port 1, VLAN tag 210 | Connection into VPN B |
| 62 | Ethernet port 2, VLAN tag 190 | Connection into VPN C |
| 63 | Ethernet port 2, VLAN tag 210 | Connection into VPN BB (backbone) |

As mentioned earlier, other technologies can be used to achieve the same results, such as Frame Relay circuits, ATM circuits, etc.

The various VLANs handled by device 20 must have their own routing tables, referred to as virtual routing and forwarding (VRF) instances, shown in block 120. This allows each VPN to use overlapping IP addresses. For example, in VPN A (FIG. 4), publisher 80 may be assigned IP address 10.10.10.10 (a private IP address), and in VPN B, publisher 83 may be assigned the same private IP address. Device 20 must be able to interact with both of these publishers. Through the use of separate routing tables in block 120, the route to the IP addresses in the separate VPNs can be kept separated.

In the higher protocol layers 121, such as TCP, different TCP connection instances 122 must be associated with a given VRF. For example, message router 120 may have a TCP session open to publisher 80 in VPN A, and a TCP connection open to publisher 83 in VPN B, where both publishers have the IP address of 10.10.10.10. Normally, a TCP session is uniquely identified by the tuple (source IP address, source TCP port number, destination IP address, destination TCP port number). When supporting multiple VPNs, the tuple is extended to include the VRF instance. Note that another way of viewing this is to have a logical TCP stack associated with each VRF instance. Similarly, other protocols such as UDP, ICMP, etc. need similar logic. The message routing logic 123 also must be aware of VRFs when managing connections to subscribers, publishers, other message routers, etc. For example, when message router 20 wishes to open a TCP connection to message router 21, it must establish a TCP connection associated with the backbone VRF 124. To support this, the application interface into the TCP/IP stack would be extended to be "VRF-aware". For example, a typical socket programmatic interface, as is known in the art, would have its addressing structures extended from taking an (IP address, protocol, port number) to take (VRF, IP address, protocol, port number) to allow applications to initiate and receive messages and connections within the context of a VPN.

It should be noted that it is desirable not to have a separate instance of the message routing logic per VRF in order to allow message flows to be efficiently shared among multiple VPNs when allowed. As an example, consider an application to deliver a data stream such as real-time market data from a stock exchange to multiple customers residing in different VPNs. Looking at FIG. 4, publisher 78 can be an application which publishes a stream of real-time market data into message router 1 over VPN D via logical link 105. In this example, certain applications in VPN A and VPN B are entitled to receive this real-time market data feed, but no applications are entitled in VPN C. The message network 100 also enables communication among the publish/subscribe applications with VPN A that is not allowed to reach applications in VPN B or C; similarly there is a set of publish/subscribe applications in VPN B that cannot communicate with VPN A or C; and there is a set of publish/subscribe applications in VPN C that cannot communicate with VPN A or C. Table 2 below shows an example of message routing entitlement group assignment which allows this behavior:

TABLE 1

Example Entitlement Group Membership for use with VPNs

| VPN | Application | Entitlement Group Membership |
|---|---|---|
| A | Publisher or Subscriber only allowed to communicate within VPN A | 1 |
|  | Subscriber in VPN A allowed to receive market data feed (from VPN D) along with communicating with other applications in VPN A | 1 and 4 |
| B | Publisher or Subscriber only allowed to communicate within VPN B | 2 |
|  | Subscriber in VPN B allowed to receive market data feed (from VPN D) along with communicating with other applications in VPN B | 2 and 4 |
| C | Publisher or Subscriber only allowed to communicate within VPN C | 3 |
| D | Publisher of market data feed | 4 |

Similarly, the control plane/routing application used to exchange subscriptions with subscribers must also use a programmatic interface into the TCP/IP stack that is "VRF-aware". In this case, either a single instance shared among all VRFs could be used, or a separate instance per VRF could be used if desired to provide control plane separation between VRFs.

The shared use of the VPN BB (over logical links 101) allow for efficient use of bandwidth. When publisher 78 publishes a message such as a stock quote which is required by both subscriber 81 in VPN A and subscriber 84 in VPN B, message router 21, after having made this determination, will forward a single copy of the message over the logical link in the BB VPN to message router 20. This single message can be shared by applications in both VPN A and VPN B, since message router 20 and 21 is a shared infrastructure handling multiple VPNs. Message router 20 can then deliver a copy of the message to subscriber 81 in VPN A and to subscriber 87 in VPN B. The use of a common backbone VPN, coupled with a shared message routing logic, allows for a shared infrastructure to keep traffic separated between VPNs when needed, and yet to efficiently share information among different VPNs when allowed. This can occur due to the decoupling of the VPNs (and the separate VRFs 120) and the shared message routing logic 123.

It should be noted that the example publisher application 78 in VPN D could be owned by the service provider which owns network 2, or it could be owned by a third-party content provider who the service provider is enabling, with permission, to access applications in VPN A and B over the shared message routing infrastructure.

Figure 6:
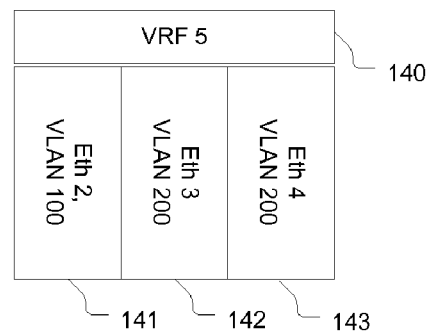
FIG. 6 shows a VRF utilizing multiple IP interfaces.

Although FIG. 5 only shows a single interface access to each VRF instance, a VRF can be reached by multiple interfaces. This is shown in FIG. 6. VRF 5 (140) contains three IP interfaces: interface 141 (Ethernet port 2, VLAN 100); interface 142 (Ethernet port 3, VLAN 200); and interface 143 (Ethernet Port 4, VLAN 200). The multiple IP interfaces can be used to provide link protection, and can be used with layer 3 equal cost multi path routing or in conjunction with Link Aggregation, as is known in the art, to increase the available bandwidth. Multiple interfaces per VRF can also be used to allow the device to multi-home to different PE routers.

Devices such as message routers have a management plane which allow the device to be managed by such protocols as a Command Line Interface (CLI), Simple Network Management Protocol (SNMP), or other management protocols as is known in the art. For example, in FIG. 5, there is an active Command Line Interface instance 127 (there can be many such instances, but only one is shown). This command line interface connects to a protocol instance such as a TCP instance 128. The service provider may wish to establish a separate VPN instance in network 1 to carry management traffic for message routers 20, 21, 22 and 23. In that case, a message router such as 20 will have a VRF 125 for this new message traffic VPN, an interface 126 will exist between message router 20 and PE 4. Another option (not shown) is for the management interfaces such as CLI 127 to use the backbone (BB) VPN; in this case CLI 127 would connect the VRF instance used for the BB VPN (over interface 63). This provides flexibility in the way that the management functions of the device 20 are accessed. Note that, for security reasons, customers applications in VPN A, VPN B, VPN C or the shared publisher application 78 in VPN D are not allowed to access the management functions from a VRF that is not the management VRF.

Figure 7:
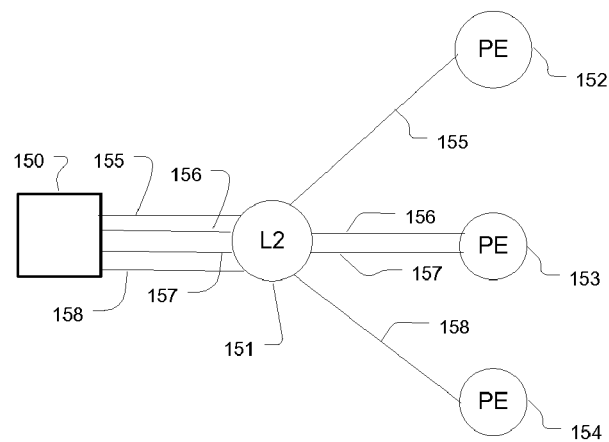
FIG. 7 shows a device connected into multiple VPNs via multiple PE routers.

FIGS. 1, 3 and 4 show a device such as 20 only being connected to a single PE router such as 4. However, a device such as 20 can be connected to multiple PE routers and interact with multiple IP VPNs. This is shown in FIG. 7. Device 150 (which could be a message router as an example) is connected into four different VPNs over links 155, 156, 157 and 158. In this example, the link is a separate Ethernet port or a VLAN on an Ethernet port or a combination of the two, but other techniques such as Frame Relay circuits could be used instead. A Layer 2 Switch 151 is used to connect device 150 into three different PE routers 152, 153 and 154. One VPN connection comes from PE router 152; two VPN connections come from PE router 153, and one VPN connection comes from PE router 154. An example use is that in a point of presence (POP), there may be multiple PE routers with the various VPNs split up amongst those PE routers, and a single message router 150 may be handling traffic from a number of VPNs spread across the PE routers 152 through 154. Another use is that a message router in one POP may be handling VPN traffic from a number of PE routers in different points of presence.

Message routers can be deployed in active-active pairs, as described in co-filed U.S. application 60/696,790, the contents of which are incorporated herein by reference. When an active-active pair of message routers are interconnected by Layer 3 only (as opposed to Layer 2), the two routers must interact with the underlying IP network as described in 60/696,790 in order for the routers to be able to dynamically move ownership of the service IP address from one message router to another. For example, in FIG. 3, device 20 and device 21 could be deployed as an active-active pair. Since in this example devices 20 and 21 are both connected into four different VPNs (VPN A, B, C and the BB VPN), four separate instances of a routing protocol run between the device 20 and PE 4 must be run, one per VRF. When device 20 takes over activity for a given XVRID (service IP address) (refer to 60/696,790), it must inject a routing change into each VPN to be the preferred route to the XVRID. The PE (such as PE 4) must be configured to import these XVRID routes from each VRF and to redistribute them to each remote site for the VPN to allow traffic from those sites to be directed to the message router (e.g. device 20) which is currently active for a given XVRID.

Figure 8:
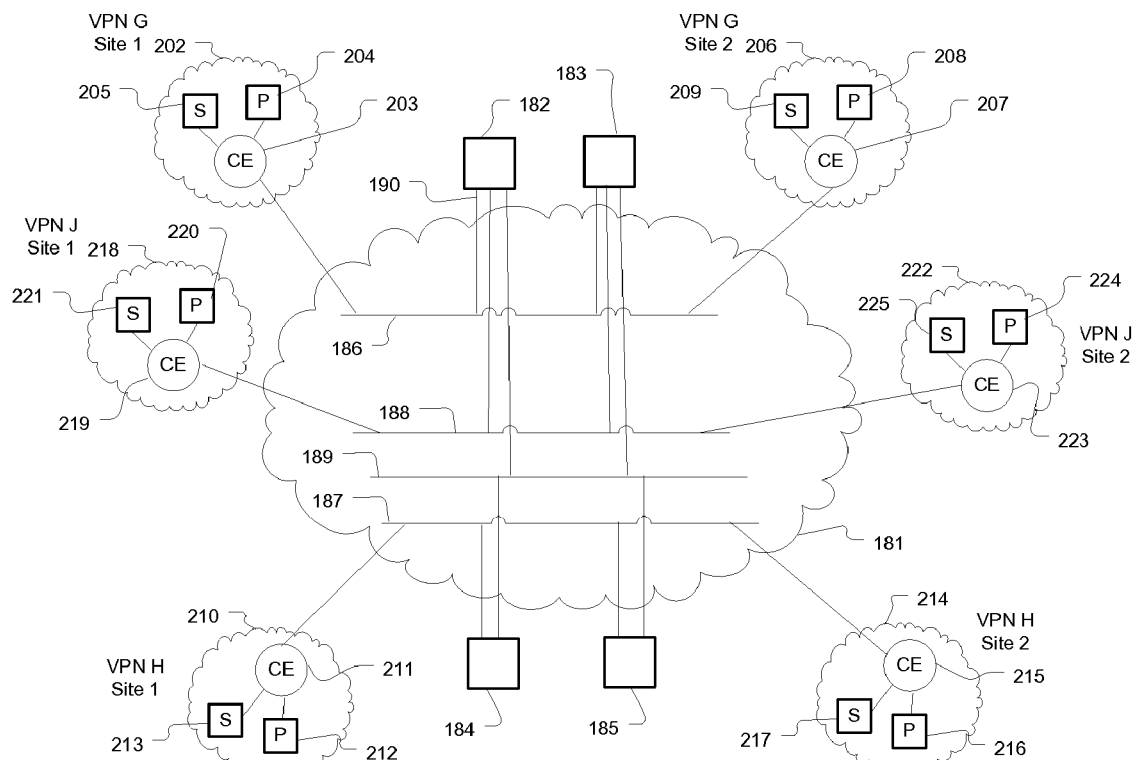
FIG. 8 shows an example of inter-working with a Transparent LAN Service network.

FIG. 8 shows an example of a Transparent LAN Service (TLS) network 181 being used to connect multiple sites together for a plurality of customer VPNs, and also being used for a shared infrastructure such as message routing being offered by the service provider. Network 181 can use technology such as MPLS, as is known in the art, to offer this service. In the case of MPLS, this capability is known as Virtual Private LAN Service (VPLS). The details of network 181 are not shown; rather the resulting VPLS instances are shown.

Customer G has two sites 202 and 206 connected via VPLS 186. In site 202, a CE router 203 is connected to the VPLS 186, and behind the CE router 203 are a plurality of publisher applications 204 and subscriber applications 205 (for this example of a publish/subscribe message routing application). In site 206 there is CE router 207, and publish/subscribe applications 208 and 209. Customer H has site 210 with CE router 211, and publish/subscribe applications 212 and 213; and site 214 with CE router 215 and publish/subscribe applications 216 and 217. Sites 210 and 214 are connected via VPLS 187. Customer J has site 218 with CE Router 219 and publish/subscribe applications 220 and 221; and site 222 with CE router 223 and publish/subscribe applications 224 and 225. Sites 218 and 222 are connected via VPLS 188. Note that for each customer G, H and J only two sites are shown, but there can be many more sites connected via VPLS 186, 187 and 188 respectively.

Message routers 182 through 185 are connected into network 181 to provide a message routing service to customers G, H and J using a shared infrastructure and inter-working with each customer's VPLS service. Message routers 182 and 183 are connected into VPLS 186 and 188 and provide service for customers G and J; message routers 184 and 185 are connected into VPLS 187 and provide service to customer H. There also exists a backbone VPLS 189 to which message routers 182 through 185 are connected. VPLS 189 serves as a common backbone between the message routers shared by the various customers (with the required traffic separation through entitlements) as previously explained for the case of IP VPNs above.

Message routers 182 and 183 could be deployed as an active-active pair as per 60/696,790. Similarly, message router 184 and 185 could be deployed as an active-active pair.

Network 180 can offer the same ability to have each customer VPN have separated traffic at the message routing layer, and at the same time to have a source of traffic shared among the various VPNs as previously described above for the market data example. On the backbone VPLS 189, a single instance of a message can be sent between message routers for eventual delivery to one or more subscribers in the same or different VPNs, as allowed by entitlements.

When a message router such as 182 wishes to send an IP packet (perhaps as part of a TCP flow or some other protocol flow) to an application such as subscriber 205 in site 202, it must determine the next IP hop to address the packet to at layer 2 (i.e. what the destination MAC address should be in the case of Ethernet). Thus, message router 182 must determine whether the next hop is CE router 203 or CE router 207 in this example. The preferred method is that the message router 182 run a separate instance of an IP routing protocol for each VRF. The IP routing protocol will then indicate the correct next-hop for a given destination. Other example techniques are static routing; provisioning one or a set of default routers and utilizing ICMP re-directs to send traffic to the preferred gateway, router discovery as per RFC 1256 ("ICMP Router Discovery Messages" September 1991, The Internet Society, the contents of which are incorporated herein by reference), etc. Such techniques are known in the art and are not discussed further.

It should be noted that the IP interface address on an interface into a customer VPLS must come from the address space of that customer subnet in which the VPLS resides (and such an address may be a private address and overlap with addresses in other customer VPLS). For example, on message router 182, interface 190 must be assigned an address from the customer address subnet for VPLS 186. Due to the use of multiple VRFs as previously described, device 182 can handle overlapping addresses, including overlapping addresses for interfaces into different VPLS.

As mentioned previously, user separation at the message layer is achieved by use of entitlements. This allows message traffic to either be contained to publishers/subscribers in the same VPN or shared among authorized publishers/subscribers from different VPNs, depending on the association of publishers/subscribers to entitlement groups at the application layer. An issue analogous to overlapping IP addressing within VRFs can occur also at the messaging layer, where the same subscription could be injected into the message network from different subscribers in different entitlement groups. For example, referring to FIG. 4, subscriber 84 of VPN B is in entitlement group 100 and subscriber 81 of VPN A is in entitlement group 200. Both can inject the same subscription into the message routing network. This subscription could be in the form of a topic subscription, an XPath Expression or any other form. Both subscriptions can optionally be tagged with the entitlement group of the subscriber when propagated to the routing protocol for distribution to other message routers. This is done in order to create separate message layer routing tables per entitlement group. This effectively forms the message layer equivalent of an IP layer VRF. Therefore, when a publisher from 9, VPN A Site 2 of FIG. 4, publishes a message, the only subscriptions that the ingress message router 21 will use in the routing decision are those tagged with the same entitlement group as the publisher and can therefore ensure that the message is only routed to egress message routers that (a) have a matching subscription that (b) is from a user in the same entitlement group. This type of per-entitlement group routing increases the efficiency of the message layer network since without it, messages are routed only based on matching subscription, but when the message arrives at the egress router, it may be discarded there because the entitlement group of the message doesn't match the entitlement group of the subscriber and therefore the bandwidth and processing of this message was wasteful.

It will be appreciated that an exemplary embodiment of the invention has been described, and persons skilled in the art will appreciated that many variants are possible within the scope of the invention.

All references mentioned above are herein incorporated by reference.

We claim:

1. A method of implementing a virtualized service simultaneously to multiple independent virtual private networks (VPNs) with potentially overlapping network addresses, comprising:

providing an underlying packet network comprising a plurality of linked physical network entities;

establishing said VPNs between specific network entities forming a subset of said linked network entities;

providing a plurality of network devices connected to said network and offering subscriber services, wherein individual said network devices have globally unique addresses and send traffic to and accept traffic from subscribers attached to specific said network entities on more than one said VPN;

propagating said globally unique addresses into said VPNs;

providing multiple interfaces for said individual network devices, wherein each said interface of a particular network device establishes a connection to a particular said VPN connected to that network device;

maintaining logically separate routing tables at each network device corresponding to each VPN connected to that network device; and routing traffic between said network devices and said VPNs using the routing table in the particular network device associated with the particularly VPN through which the traffic is being routed;

whereby a logical instance of the virtualized service is provided to each VPN while maintaining integrity of the separate VPNs.

2. The method of claim 1, wherein each separate interface is a separate physical interface.

3. The method of claim 1, wherein each separate interface is a separate flow on a common physical interface.

4. The method of claim 1, wherein the connection instance is provided by an Ethernet port with VLAN tagging, each VLAN tag being associated with a corresponding VPN.

5. The method of claim 1, wherein said one or more network devices are message router(s).

6. The method of claim 5, wherein a plurality of said message routers are interconnected by a common VPN backbone, whereby a message required by different VPNs can be sent as a single shared copy over said common VPN backbone between said network devices.

7. The method of claim 6, wherein said message routers are content-based routers.

8. The method of claim 1, wherein said VPNs are implemented using virtual private network technologies selected from the group consisting of: IP VPNs, transparent LAN service, VPLS, Frame Relay, ATM, and Time-division multiplexing.

9. The method of claim 1, wherein said service is content-based message routing.

10. The method of claim 1, wherein logical instances of the virtualized service are provided by an application running on a said network device connected to multiple provider edge routers.

11. The method of claim 1, wherein logical instances of the virtualized service are provided by an application running on a said network device connected to a provider edge router over multiple connections.

12. The method of claim 11, wherein one said connection is provided for each VPN, and one said connection is provided for a backbone VPN.

13. The method of claim 1, wherein a single logical instance of the virtualized service to at least two VPNs to allow communication between VPNs in accordance with pre-established entitlements using shared equipment.

14. The method of claim 13, wherein the virtualized service is a content-based message routing service, and a publisher on a first VPN can reach a subscriber on a second VPN sharing said single logical instance.

15. The method of claim 14, wherein the messages are delivered between VPNs over a common backbone VPN.

16. A network providing a content based message routing service comprising:

a plurality of linked entities forming an underlying packet network wherein data traffic is routed between said network entities;

a plurality of message routers connected to said network, each message router having a globally unique address;

a plurality of virtual private networks established on said packet network and connected to said message routers, said globally unique address being propagated through said VPNs;

said individual message routers having multiple interfaces associated with the respective VPNs; and logically separate routing tables maintained at said individual message routers for each VPN connected thereto, whereby traffic is routed between said network devices and said VPNs using the routing table in a particular network device associated with the particular VPN through which the traffic is being routed such that a logical instance of the virtualized service is provided to each VPN while maintaining integrity of the separate VPNs using shared equipment.

17. The network of claim 16, comprising a plurality of said message routers interconnected by a common backbone to permit sharing of a common message by different VPNs when they are each entitled to that message.

18. The network of claim 16, wherein the interface on said message routers comprises an Ethernet port with VLAN tagging, wherein each VLAN tag is associated with a different VPN.

19. The network of claim 16, wherein said message routers are connected to a shared infrastructure to permit publishers on one VPN to reach subscribers on another VPN in accordance with pre-established entitlements.

20. The network of claim 19, wherein said message routers are interconnected over links residing in a backbone virtual private network, and traffic carried between different routers for various customers is separated in accordance with message routing entitlements.

* * * * *